J. L. WARE & W. S. FLEMING.

COMBINED ANVIL, VISE, AND DRILL.

No. 9,944. Reissued Nov. 22, 1881.

Witnesses:
J. M. Burnham
D. P. Cowl

Inventors:
J. L. Ware and
W. S. Fleming,
By P. T. Dodge
atty.

N. PETERS, Photo-Lithographer, Washington, D. C.

UNITED STATES PATENT OFFICE.

JOSEPH L. WARE AND W. SCOTT FLEMING, OF PINE ISLAND, MINNESOTA.

COMBINED ANVIL, VISE, AND DRILL.

SPECIFICATION forming part of Reissued Letters Patent No. 9,944, dated November 22, 1881.

Original No. 239,686, dated April 5, 1881. Application for reissue filed August 1, 1881

*To all whom it may concern:*

Be it known that we, JOSEPH L. WARE and W. SCOTT FLEMING, of Pine Island, in the county of Goodhue and State of Minnesota, have invented a new and useful Improvement in a Combined Anvil, Vise, and Drill; and we do hereby declare that the following is a full, clear, and exact description of the same, reference being had to the accompanying drawings.

Figure 1:
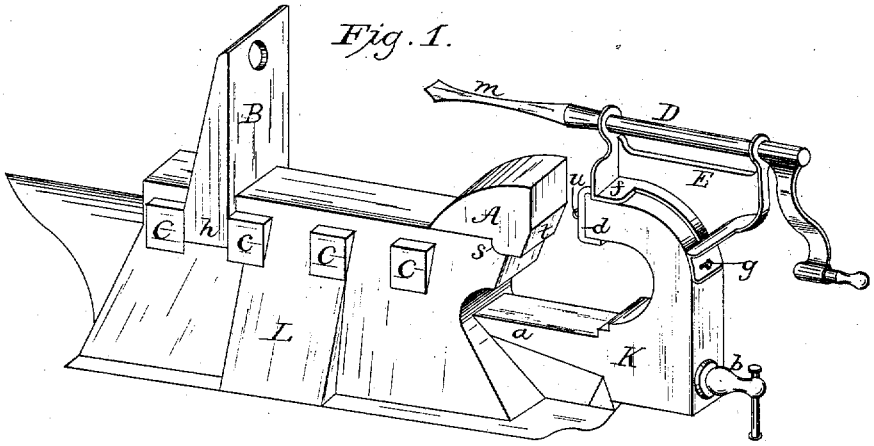
Figure 2:
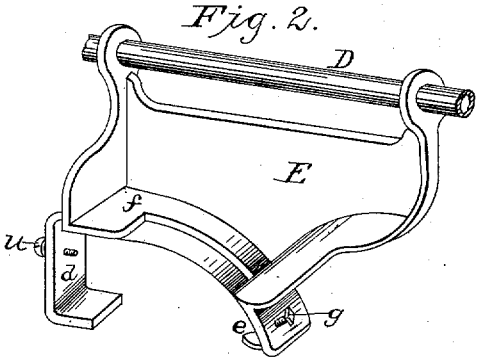
Figure 4:
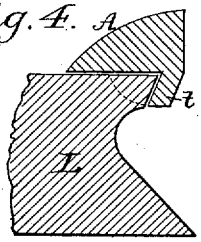
Figure 3:
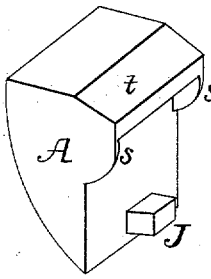

Figure 1 is a perspective view of an anvil constructed according to our invention, and provided with our vise and drill attachments. Fig. 2 is a perspective view of the drill-head detached. Fig. 3 is a perspective view of the detachable vise-jaw. Fig. 4 is a detail sectional view.

The object of our invention is to produce a combination apparatus embracing an anvil, a vise, and a drilling-machine, each of which may be used with the same efficiency as if constructed separately.

To this end the invention consists in the combination of an anvil, a movable vise-jaw, a spindle-carrying head, and a standard upon the anvil, said parts being constructed and combined with one another as hereinafter fully described.

In carrying out our invention we provide an anvil at the rear end with a fixed but detachable vise-jaw, and with a movable jaw co-operating with the other. We also provide a drill-spindle mounted in a head, which is adapted for instantaneous attachment to the movable jaw of the vise. We also provide the anvil with a detachable standard, adjustable lengthwise thereon.

Referring to the drawings, upon the quarter of the anvil L, or the end thereof which is farthest from the horn, a removable vise-jaw, A, is held in place while in use by means of wings or flanges *s* and *t*. Said wings *s* embrace the lateral sides of the corners of the anvil, and the flange *t* overhangs and fits snugly against the beveled end of the anvil, Fig. 4. The jaw A is also provided with a dowel-pin, J, which enters the hardy-hole (not shown) in the face of the anvil. Such dowel-pin assists the flanges *s t*, although but slightly, in holding the jaw A firmly in place.

The drill-head E, carrying rotatable spindle D, provided with boring-point *m*, is attached to an adjustable vise-jaw, K, which rises to the same height as the aforesaid jaw A, and is formed solid with a bar, *a*, that slides lengthwise through the body of the anvil L, being adjusted as required by means of a screw, *b*, Fig. 1. The drill-head E is held firmly in place by the flange *d*, claw *e*, and clamp-screw *u*. The curved base *f* of the drill-head E fits closely on the jaw K, and the claw *e* enters a cavity in the same, while the screw *u*, which passes through the arm *d*, serves to draw and hold the drill-head firmly in place, so that it can have no lateral or vertical movement. The screw *g* assists in such clamping action, but is not indispensable. On each side of the anvil L, a short distance below the face, is a row of lugs, C, which are separated a sufficient distance to receive the legs *h* of the upright jaw or standard B between them. Said standard B may be adjusted toward or from the drill-head E by adjusting it between different pairs of lugs C, as will be readily understood, and it subserves the usual purpose of holding or supporting pieces or articles while being drilled.

It is obvious that to use the anvil the standard B, movable jaw A, and drill-head E must be removed, which leaves the face of the anvil, with hardy and punch holes, &c., available for use.

To use the vise A K, remove the drill-head E; and to use the vise for large or broad work, remove the movable jaw A and allow the upright jaw or standard B to serve in its place, which the projection of the jaw K above the surface of the anvil permits.

To use the drill-head E, place it in position shown in Fig. 1, remove the jaw A, then by crowding the jaw K forward in the usual manner and turning crank attached to the spindle D, into which the bit *m* is inserted, the work is performed.

We are aware that the movable jaw of a vise has been arranged to act against one end of a drill-spindle passing through the stationary jaw of the vise, and surrounded by a box or bearing therein.

We are also aware that a rotating sleeve has been seated in and extended through the fixed jaw of a vise to receive a drill, the object to be drilled being sustained against the movable jaw of the vise.

It will be observed that under our method of construction the vise-jaws are left solid and intact; that the drill-head consists of a spindle and a supporting-stock therefor, the stock being adapted for application to the movable jaw of a vise.

We do not claim as our invention or desire to cover a drill-spindle passing through the jaw of a vise.

The arrangement of the drill-spindle in a support mounted above the vise-jaws and upon the outer movable jaw is advantageous, in that it avoids the necessity of boring through and weakening the jaw of the vise; also, in that it permits the drill-spindle to be set at a greater distance above the anvil, permitting objects of larger size and greater height to be drilled; also, in that it gives a much wider space between the standard which supports the work and the drill, giving the apparatus capacity to receive much larger articles than otherwise.

What we claim, and desire to secure by Letters Patent, is—

1. The combination of an anvil, a movable vise-jaw, a spindle-carrying head detachably mounted upon and extending above the movable jaw, and a standard upon the anvil.

2. The combination of the anvil, the movable vise-jaw, the drill stock or spindle, and a support therefor detachably mounted upon the top of the jaw, substantially as described and shown.

3. In combination with an anvil, a movable vise-jaw at one end, and an upright arm or standard at its opposite end, whereby provision is made for clamping articles upon the anvil between the jaw and standard.

4. The combination of the anvil, the movable vise-jaw at one end of the same, and the upright arm or standard attached to and adjustable lengthwise upon the anvil.

5. The combination of the anvil, the detachable standard, the independently-detachable vise-jaw upon one end of the anvil, and the movable vise-jaw having the detachable drill-stock mounted thereon.

6. The combination of the anvil, the standard thereon, the movable vise-jaw, and the drill-spindle head detachably mounted upon and extending above said jaw.

7. The combination of the anvil, the movable vise-jaw located at one end thereof, the drill-stock mounted upon said jaw, and the standard secured to and adjustable lengthwise upon the anvil, substantially as described and shown.

JOSEPH L. WARE.
W. S. FLEMING.

Witnesses:
LOOMIS F. IRISH,
N. FLEMING.